US006812938B2

(12) United States Patent
Pinnell

(10) Patent No.: US 6,812,938 B2
(45) Date of Patent: Nov. 2, 2004

(54) METHOD AND SYSTEM FOR PROVIDING STATUS INDICATION AND CONTROL TO A COMPUTER NETWORK USER

(75) Inventor: Nigel Pinnell, Santa Monica, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 335 days.

(21) Appl. No.: 09/815,178

(22) Filed: Mar. 22, 2001

(65) Prior Publication Data

US 2002/0055997 A1 May 9, 2002

Related U.S. Application Data

(60) Provisional application No. 60/192,874, filed on Mar. 29, 2000.

(51) Int. Cl.[7] ................................................ G09G 5/00
(52) U.S. Cl. ....................... 345/741; 345/742; 345/744; 345/745; 345/772; 345/808; 705/64; 705/67; 709/219; 713/200; 713/201
(58) Field of Search ................................ 345/733, 736, 345/742, 744, 745, 772, 780, 741, 749, 808, 809; 705/64, 67, 70, 73; 709/203, 219; 713/200, 201

(56) References Cited

U.S. PATENT DOCUMENTS

| 4,888,801 A | 12/1989 | Foster et al. ............... 380/21 |
| 4,924,513 A | 5/1990 | Herbison et al. ............. 380/21 |
| 5,602,996 A | * 2/1997 | Powers et al. .............. 345/807 |
| 5,805,166 A | 9/1998 | Hall, Jr. et al. .............. 345/349 |
| 5,821,937 A | 10/1998 | Tonelli et al. ............... 345/356 |
| 5,892,900 A | * 4/1999 | Ginter et al. ................ 713/200 |
| 5,937,159 A | 8/1999 | Meyers et al. ......... 395/187.01 |
| 6,023,273 A | 2/2000 | Cox et al. .................... 345/339 |
| 6,055,236 A | * 4/2000 | Nessett et al. .............. 370/389 |
| 6,073,119 A | * 6/2000 | Bornemisza-Wahr et al. . 705/42 |
| 6,088,728 A | 7/2000 | Bellemore et al. .......... 709/227 |
| 6,182,225 B1 | * 1/2001 | Hagiuda et al. ............. 713/201 |
| 6,289,380 B1 | * 9/2001 | Battat et al. ................. 709/224 |
| 6,336,095 B1 | * 1/2002 | Rosen ............................ 705/1 |
| 2002/0059369 A1 | * 5/2002 | Kern et al. ................... 709/203 |

OTHER PUBLICATIONS

"Latest VPN Products", Communications News; 5/00.

* cited by examiner

Primary Examiner—John Cabeca
Assistant Examiner—Cuong T. Thai
(74) Attorney, Agent, or Firm—George T. Marcou; Kilpatrick Stockton LLP

(57) ABSTRACT

A method and system for providing status indication to a control panel displayed on a user's computer screen at all times which allows the user to sign on and off independently of any specific secure function, and utilizes both graphics and text to clearly indicate the current status of a secure connection. Additionally, entitlements or privileges associated with the secure connection and a count down of the remaining period of time during which the status of the secure connection will be in effect, are also displayed. A user may extend the effective time of the secure connection, or cancel the secure session and unequivocally sign off from all related services with a single click of the button.

33 Claims, 4 Drawing Sheets

METHOD AND SYSTEM FOR PROVIDING STATUS INDICATION AND CONTROL TO A COMPUTER NETWORK USER

PRIORITY APPLICATION

This application claims the benefit of U.S. Provisional Application No. 60/192,874 filed Mar. 29, 2000, entitled "Method and System for Providing Status Indication and Control to a Computer Network User (Connection Security Status Indicator)," incorporated herein by this reference.

FIELD OF THE INVENTION

The present invention relates generally to the field of computer networks and more particularly to a method and system for providing status indication and control to a user of a secure network connection, such as a secure Internet connection.

BACKGROUND OF THE INVENTION

Currently, there can be an element of user uncertainty in the status of a connection to an Internet site or service. When a user signs onto a secure session with a service provider on the Internet by providing a user identification (ID) and password, the actual security status of the user's connection at any given time is not always immediately clear to the user. This situation is distinguished, for example, from the situation in which one uses an automatic teller machine (ATM). In the case of an ATM, when a cardholder approaches the ATM and inserts a transaction card and enters a personal identification number (PIN), the cardholder can expect that the ATM will accept instructions and deliver confidential information. The ATM generally has a "good-bye" screen, and when the session is over, the card is returned to the cardholder in those machines that have a transport reader. The cardholder can also expect that when the cardholder leaves the particular machine, the particular secure session is over and no one else can walk up and take advantage of the privileges provided by the cardholder's signing on with the his or her PIN.

On the other hand, with a connection to a web site, the security status of the session, the period of time in which the secure session is in effect, and exactly what capabilities are authorized is not as clear. Current web browsers for personal computers provide a graphical indication that the connection with the host system is secure, i.e., that communication between the computers is encrypted and the source of data received can be verified, but these icons do not provide any indication of whether the user is "signed on" with transactional capabilities. Most secure Internet services operate on a time-out basis in which the entitlements granted by signing on are available for a fixed period of time after the user authentication takes place and may be extended for a similar period each time the user interacts with the service. In some applications, this method is used to conserve system resources as well as to enforce security. Some services employ a warning mechanism that alerts the user to the imminent expiry of this period, while others time out passively, simply declining transactions which are received after the prescribed amount of time. In some cases the time-out period remains valid even after the user directs his or her browser to other sites, resuming the trusted session when and if the user returns. In other cases, the session is canceled if a specific window is closed or redirected.

Typically, the user signs onto a secure web site, and from that point, the server at the other end provides the user with information which is perhaps confidential and accepts instructions, for example, to move money, pay money to others, and the like. However, there is not necessarily a clear indication of when that secure session ends. It is possible to have a sign-off link on the user's screen that can be clicked on, and then the machine verifies that the session is over. However, the nature of connecting to a site on the worldwide web (WWW) is slightly different from many other transactional interactions. For example, the user can visit another site on the WWW and/or visit another site and perform an entirely different transaction, and there is no clear indication of the state of the secure session when the user returns to the original web site. For another example, if the user visits another site on the WWW and does not return to the original web site, there is no clear indication of how long the secure session on the original site will remain in effect, what transactions will be allowed, and what information will be provided.

Those questions become a little broader in terms of the uncertainty when consideration is given to web sites that have some type of single sign-on capability, such as provided by the invention described in U.S. patent application Ser. No. 09/668,112 filed Sep. 22, 2000, entitled, "Method and System for Single Sign-On User Access to Multiple Web Servers," incorporated herein by this reference. With such capability, for example, upon signing on by a user to perform a specific transactional service, the web site offers as a convenience to the user the automatic authorization to perform one of many different services, perhaps with many different servers. For example, in logging on by the user to check the user's checking balance, as a convenience to the user, a web site may also imply that the user now has the privilege to make a stock trade or perform any one or more of several other different types of transactions, without having to provide all of the user's information to log on again. Again, it is not necessarily always clear exactly what entitlements are enabled, for what period of time they are enabled, and when they will be revoked in terms of a system time-out or some action by the user.

SUMMARY OF THE INVENTION

It is a feature and advantage of the present invention to provide a method and system for status indication and control to a user of a secure network connection that gives the user a consistent indicator of the user's connection status with a service showing what entitlements are presently enabled and the remaining time for which they are available.

It is another feature and advantage of the present invention to provide a method and system for status indication and control to a user of a secure network connection that enables the user to extend the secure session at any time without having to move between functions or otherwise perform unnecessary actions to keep the session active.

It is an additional feature and advantage of the present invention to provide a method and system for status indication and control to a user of a secure network connection that enables the user to terminate the secure session simply and canceling the secure entitlements on all of the functions and systems of the service at once.

To achieve the stated and other features, advantages and objects, an embodiment of the present invention makes use of computer hardware and software to provide a user with a control panel displayed on the user's computer screen which allows the user to sign on and sign off independently of any specific secure function, utilizing both graphics and text to clearly indicate the current status of the secure connection.

If the particular status allows any privileged actions to be performed by the user, the control panel shows a count down of the remaining period of time during which that status will remain in effect. Depending on the capabilities of the user's computer operating system, the control panel interface has the necessary attributes to be visible at all times, appearing in front of any program window.

In an embodiment of the present invention, the user at a computing device, such as the user's personal computer with a browser, is allowed to establish a secure network connection between the computing device and a website server via a network, such as the Internet, using public key certificates to assure that the computing device is correctly identified to the website server. In a single sign-on aspect for an embodiment of the present invention, the website server can be one of a number of servers in a federation of web servers. An application for an embodiment of the present embodiment, running on the user's computing device, provides a graphical user interface displaying a control panel at the computing device with a current status of the secure network connection to the website server. The control panel displays, for example, an icon that indicates to the user that the secure network connection to the website server is established. The control panel is continuously displayed at all times the computing device is activated and can be provided with an attribute that causes the control panel to be continuously visible on the front of the computing device display screen.

The control panel for an embodiment of the present invention displays a time out period during which the current status will remain in effect. Further, if a user privilege is associated with the current status, the control panel displays the time out period during which the user privilege will remain in effect, for example, in the form of a countdown timer. In addition, the control panel displays options for the user which enables the user to extend the time out period and/or view information about the user privilege. In a sign off aspect for an embodiment of the present invention, the user is allowed to simultaneously cancel the secure network connection, sign off independently of a specific function and revoke any privileges associated with the secure network connection by clicking on a sign off option displayed on the control panel.

The application that provides the graphical user interface for an embodiment of the present invention can be downloaded to the computing device via a host system and/or the website server. For example, the application can be downloaded to the computing device via the website server when the secure network connection is established, and the application can be downloaded automatically when the secure network connection is established. Alternatively, the application is a stand-alone utility that can be downloaded to the computing device and which adopts formal protocols and works on or more secure servers in addition to the website server.

Additional objects, advantages and novel features of the invention will be set forth in part in the description which follows, and in part will become more apparent to those skilled in the art upon examination of the following, or may be learned by practice of the invention.

DETAILED DESCRIPTION

Referring now in detail to an embodiment of the invention, an example of which is illustrated in the accompanying attachments, the method and system for an embodiment of the present invention makes the security status of the user's connection to a web site clearer to the user and less implied. Many security permissions are actually enabled by tokens of information passed between the user's computer and the server computer which are not visible to the user, usually known as cookies. Others are governed by timer programs running on the server that acknowledge that the user's sign-on is good for a specific period of time, after which any attempt to transact further is refused, because a new authorization is required. Typically, these tokens and timer programs are transparent to the user, although the state of the user's computer is not always clear, and it is not clear to the user whether it is safe to leave the particular computer unattended. Another annoying aspect is that this is occurring on other computers and is not being made visible to the user, and the user can often be interrupted and surprised, for example, while reading some content or performing some other task.

An embodiment of the present invention makes it always clear exactly when the system is about to time out and also prevents unexpected interruptions, such as asking the user for a response in order to confirm that the user is still at the computer in order to confirm that the user wants his or her authorization to be extended. One side effect of such interruptions is that it is often necessary for users to "tickle" the application and make navigational changes that the user does not particularly want to make, in order in effect to keep the application awake at the other end, such as re-setting the timer so that the entire session does not time out. Generally, users do not necessarily want to perform that type of navigational change but simply want to extend the time-out period.

Figure 1:
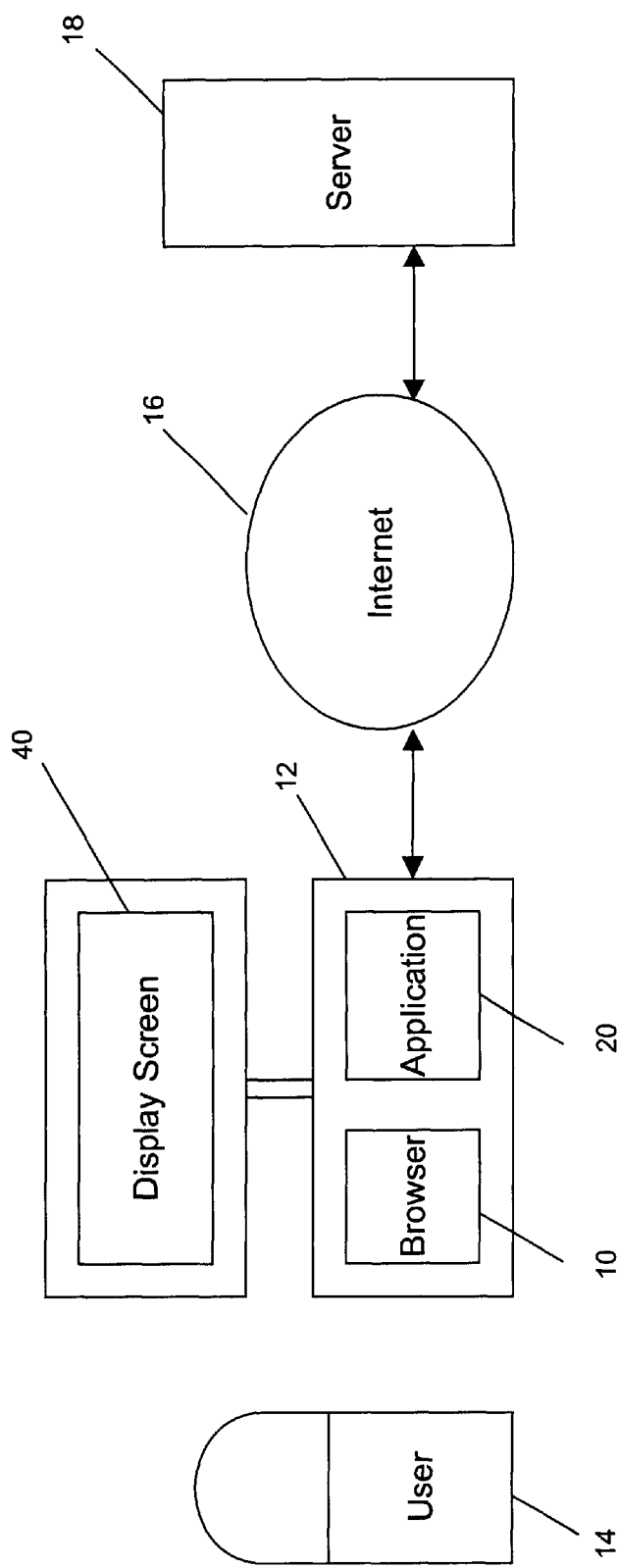
FIG. 1 is a schematic diagram which illustrates an example of key components and the flow of information between key components of the system and method for an embodiment of the present invention.
Figure 2:
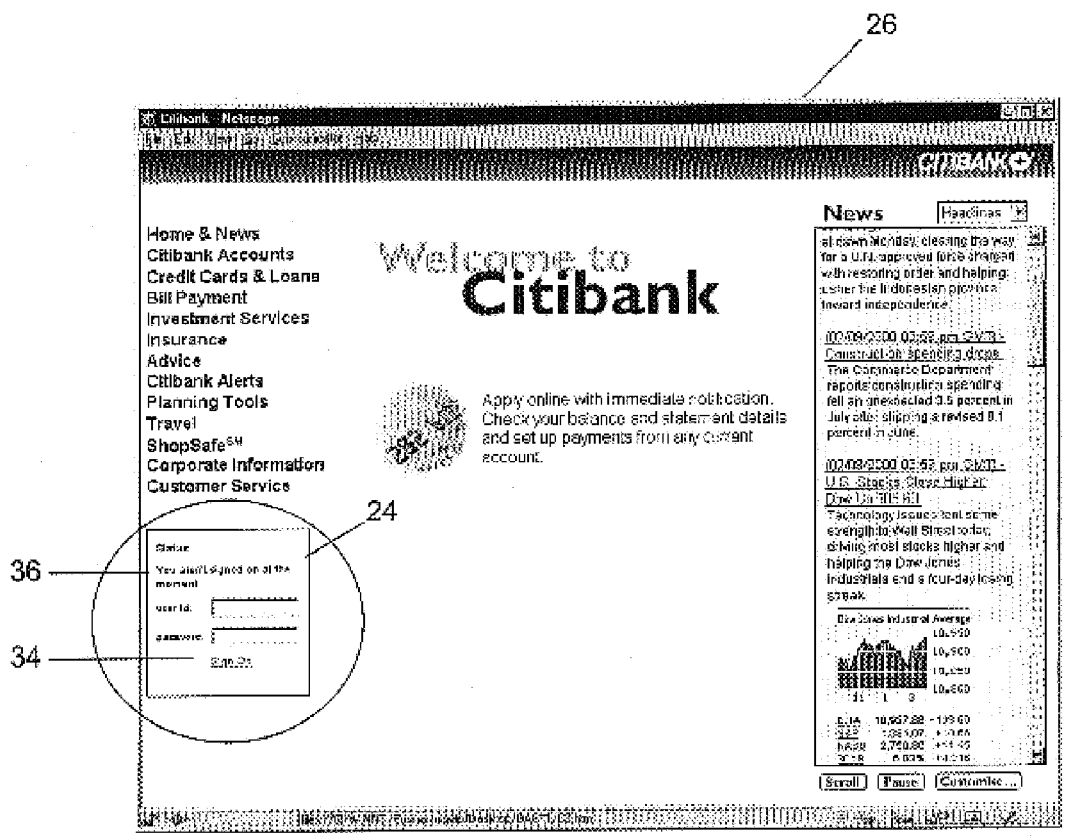
FIGS. 2 and 3 illustrate examples of a graphical user interface (GUI) display screen in signed on and signed off conditions, respectively, for an embodiment of the present invention.
Figure 3:
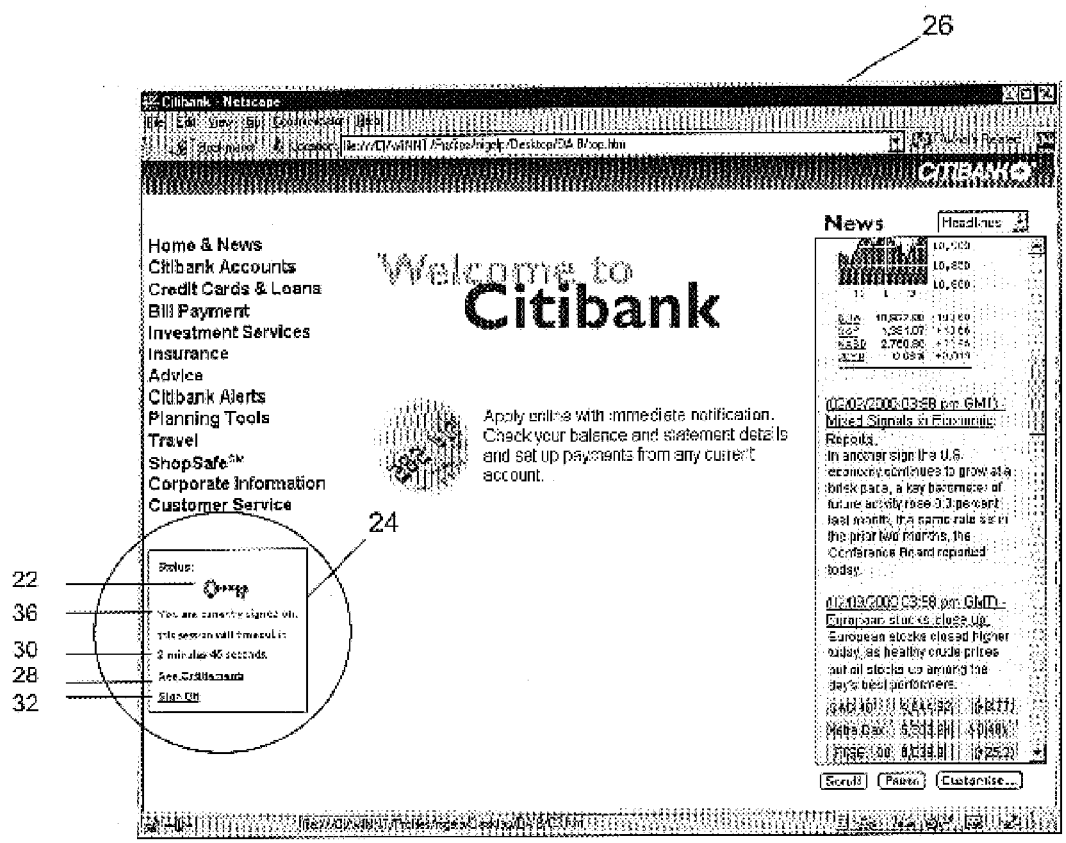

FIG. 1 is a schematic diagram which illustrates an example of key components and the flow of information between key components of the system and method for an embodiment of the present invention. FIGS. 2 and 3 illustrate examples of graphical user interface (GUI) display screens in signed on and signed off conditions, respectively, for an embodiment of the present invention. An embodiment of the present invention makes use, for example, of an application 20 running on a local computing device, such as the personal computer (PC) 12 of a user 14, coupled over a network, such as the Internet 16, to a web server 18, utilizing a browser 10 on the user's PC 12. The terms "PC," "computer," and "computing device" are use interchangeably herein from time to time; and the terms "application," "program," "application software," and "software" are used interchangeably herein from time to time.

The method and system for an embodiment of the present invention indicates to the user 14 that a particular computer, such as the user's PC 12, has a secure connection, indicated by a "Secure" icon 22 displayed on a control panel 24 of the signed on GUI screen 26, as shown in FIG. 2, and that anyone using the PC 12 currently will have certain privileges granted to them. Further, an embodiment of the present invention can provide, for example, information on those privileges. Should the user 14 require to view the privileges, the user 14 clicks on a "See Entitlements" option 28 displayed on the control panel 24 of the signed on GUI screen 26. An embodiment of the present invention also indicates for how long those privileges will continue to be available, for example, in the form of a count-down timer 30 also displayed on the signed on GUI screen 26. An embodiment of the present invention provides a means for the user 14 to extend that period of time, for example, if the user 14 is looking at an interesting item of content and simply wants to extend the period.

In addition, an embodiment of the present invention provides the user 14 a means to revoke all of those privileges in a single operation, very clearly canceling the secure session and unequivocally signing off from all related services with a single click, for example, on a "Sign Off" option 32 displayed on the signed on GUI screen 26 of the user's PC 12. In an aspect of an embodiment of the present invention, depending on the client/browser software that the user 14 is using, the actual indicator and controls that provide this information and these abilities to monitor and control the security of the session are visible on the user's PC screen 40 at all times via the control panel 24. Also depending on the particular browser 10 that the user 14 is using, certain attributes can be given to the control panel or window 24 in which these controls appear and can cause the controls to always be visible at the front of the display screen of the user's PC 12. Thus, should the user 14 go off and start working on some other task on the computer 12, there is still a clear indication to the user 14 at all times, for example, on the signed on control panel 24, that a secure session has been established and that a trusted set of privileges has been extended to the particular computer 12 at a particular time.

The system for an embodiment of the present invention is designed for a visual output device, such as the PC 12, that is connected to a server 18 via a network, such as the Internet 16, or some other connection and includes certain underlying software technologies that make the session secure. For example, use is made of public key certificates generally used to assure that the PC 12 is correctly identified to the server 18. Essentially, once the server 18 and the browser PC 12 establish a secure connection, a public key certificate number is passed transparently to the PC 12 from the server 18 so that another computer cannot come in and impersonate the user's computer 12. Such underlying software technology enables a secure trusted session, but a primary focus of an embodiment of the present invention is a means of indicating the status of the particular connection and of the particular session to the user 14 and a means of affording the user greater clarity of its status and its control.

Figure 4:
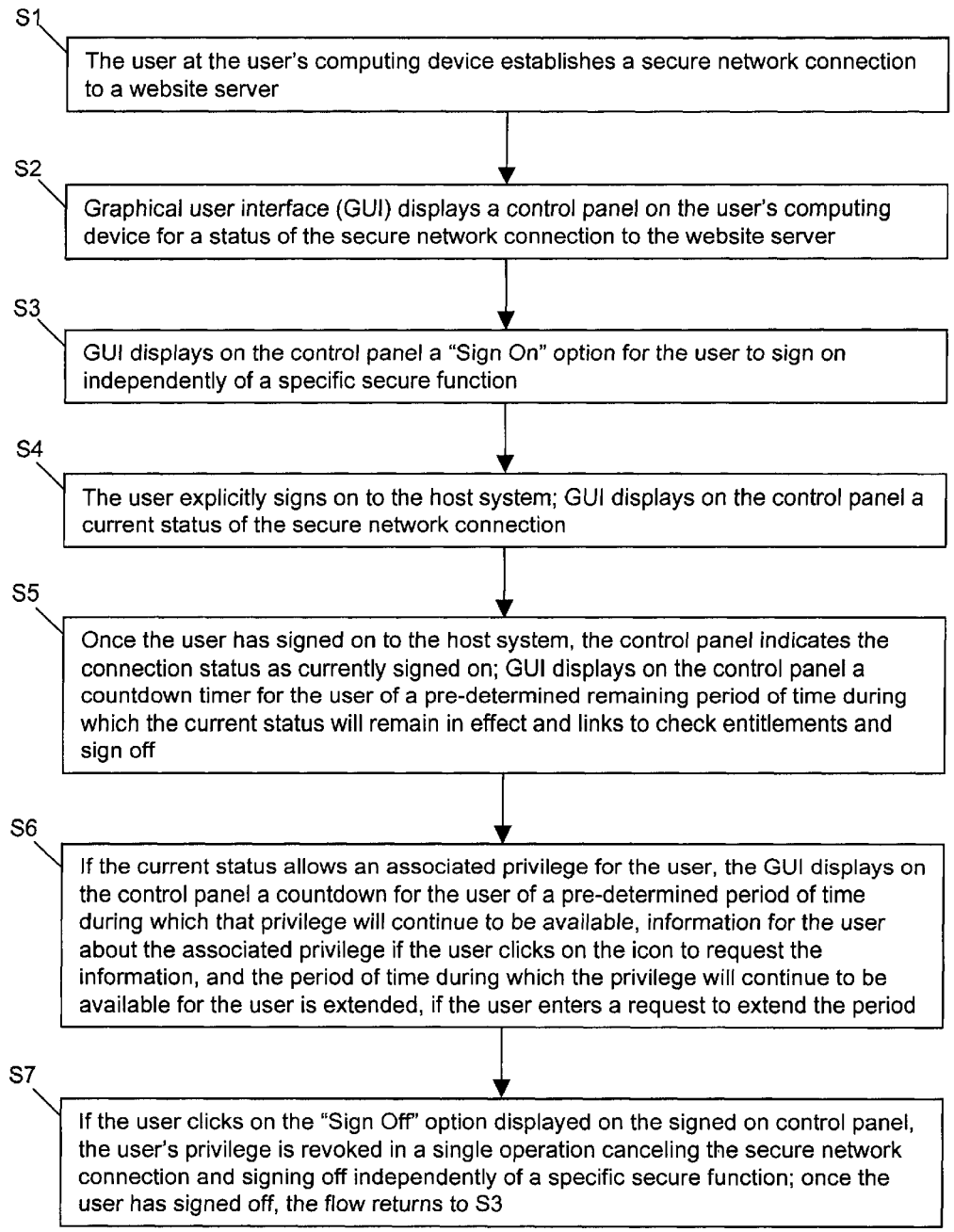
FIG. 4 is a flow chart which illustrates an example of the process of providing status indication and control to a user of a computing device with a secure network connection for an embodiment of the present invention.

FIG. 4 is a flow chart which illustrates an example of the process of providing status indication and control to a user of a computing device with a secure network connection for an embodiment of the present invention. Referring to FIG. 4, at S1, the user 14 at the user's computing device 12 establishes a secure network connection to the website server 18. At S2, the graphical user interface (GUI) displays the control panel 24 on the user's computing device 12 for a status of the secure network connection to the website server 18. At S3, the GUI displays on the control panel 24 the "Sign On" option 34 as shown in FIG. 2, that indicates the connection status as not signed on, for the user 14 to sign on independently of a specific secure function. At S4, the user 14 explicitly signs on to the host system; the GUI displays on the control panel 24 a current status 36 of the secure network connection, as shown in FIGS. 2 and 3. At S5, once the user 14 has signed on to the host system, the control panel 24 indicates the connection status as currently signed on. The GUI displays on the control panel 24 a countdown timer 30 for the user 14 of a pre-determined remaining period of time during which the current status will remain in effect and links to check entitlements and sign off. At S6, if the current status allows an associated privilege for the user 14, the GUI displays on the control panel 24 a countdown 30 for the user 14 of a pre-determined period of time during which that privilege will continue to be available, information for the user about the associated privilege if the user clicks on the icon 28 to request the information, and the period of time during which the privilege will continue to be available for the user 14 is extended, if the user 14 enters a request to extend the period. At S7, if the user 14 clicks on the "Sign Off" option 32, as shown in FIG. 3, displayed on the signed on control panel 24, the user's privilege is revoked in a single operation canceling the secure network connection and signing off independently of a specific secure function. Once the user 14 has signed off, the flow returns to S3.

The software program 20 for an embodiment of the present invention runs, for example, on the user's PC 12 and is an application that can be sent to the client's computer 12 via a host or server system, such as web server 18. It is necessary for the program 20 on the user's PC 12 to understand the specifics of the security policy of the server 18 and the server program to which the user's PC 12 is connected. In other words, if the particular server 18 times out and revokes privileges after two minutes of inactivity, in order to accurately reflect how much remaining time is available to the user 14, the application 20 for an embodiment of the present invention that performs the task of the control panel 24 must know that information about the particular server 18.

The application software 20 for an embodiment of the present invention is provided to the user's PC 12 when the user 14 connects to a site that supports it, such as server 18, and it is not necessary for the user 14 to actively seek out the software 20. Instead, the software 20 is sent to the user's PC 12 automatically when the user 14 accesses a secure site, such as server 18, somewhat like a cookie. However, unlike a cookie which is simply stored on the user's PC 12 and is not visible to the user 14, an embodiment of the present invention involves a GUI that enables the user 14 to actually view a small box, such as control panel 24, on the display screen 40 of the user's PC 12 that tells the user 14 the status of the secure session with the server 18. An alternative aspect of an embodiment of the present invention utilizes, for example, a stand-alone device or utility that adopts formal protocols and can work on other secure servers. That type of device or utility, for example, can be actively downloaded and run on the user's computer 12.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for providing status indication and control to a user of a computing device with a secure network connection, comprising:
   allowing the user at the computing device to establish the secure network connection between the computing device and a website server via a global network using public key certificates identifying the computing device to the website server;

providing a graphical user interface displaying a control panel at the computing device with an icon on the control panel that indicates to the user that the secure network connection to the website server is established and with a current status of the secure network connection to the website server;

displaying on the control panel a time out period during which the current status and at least one user privilege associated with the current status will remain in effect, an option for the user to extend the time out period, and an option for the user to view the information about the associated user privilege; and allowing the user to cancel the secure network connection and sign off independently of a specific secure function by clicking on a sign off option displayed on the control panel.

2. The method of claim 1, wherein allowing the user at the computing device to establish the secure network connection further comprises allowing the user at a personal computer with a browser to establish the secure network connection between the personal computer and the website server via the global network.

3. The method of claim 1, wherein allowing the user at the computing device to establish the secure network connection further comprises allowing the user to establish the secure network connection between the computing device and at least one website server in a federation of web servers.

4. The method of claim 1, wherein providing the graphical user interface further comprises providing the graphical user interface by an application running on the computing device.

5. The method of claim 4, wherein providing the graphical user interface further comprises downloading the application to the computing device via a host system.

6. The method of claim 4, wherein providing the graphical user interface further comprises downloading the application to the computing device via the website server.

7. The method of claim 6, wherein providing the graphical user interface further comprises downloading the application to the computing device via the website server when the secure network connection is established.

8. The method of claim 7, wherein providing the graphical user interface further comprises downloading the application to the computing device automatically by the website server when the secure network connection is established.

9. The method of claim 4, wherein providing the graphical user interface by the application further comprises providing the graphical user interface by a stand-alone utility that adopts formal protocols and can work on at least one secure server other than the website server.

10. The method of claim 9, wherein providing the graphical user interface by the application further comprises downloading the stand-alone utility on the computing device.

11. The method of claim 1, wherein providing the graphical user interface displaying the control panel further comprises continuously displaying the control panel at all times the computing device is activated.

12. The method of claim 11, wherein providing the graphical user interface displaying the control panel further comprises providing an attribute to the control panel causing the control panel to be continuously visible on a front of a display screen of the computing device.

13. The method of claim 1, wherein displaying on the control panel the time out period further comprises displaying on the control panel the time out period during which the user privilege will remain in effect in the form of a countdown timer.

14. The method of claim 1, wherein displaying on the control panel the time out period further comprises displaying on the control panel information about the associated user privilege.

15. The method of claim 1, wherein allowing the user to cancel the secure network connection and sign off further comprises displaying on the control panel options for the user to sign on and sign off independently of a specific secure function.

16. The method of claim 15, wherein allowing the user to cancel the secure network connection and sign off further comprises allowing the user to simultaneously cancel the secure network connection, sign off independently of the specific function and revoke at least one privilege associated with the secure network connection with a selection of the sign off option.

17. A system for providing status indication and control to a user of a computing device with a secure network connection, comprising:

means for allowing the user at the computing device to establish the secure network connection between the computing device and a website server via a global network using public key certificates identifying the computing device to the website server;

means for providing a graphical user interface displaying a control panel at the computing device with an icon on the control panel that indicates to the user that the secure network connection to the website server is established and with a current status of the secure network connection to the website server;

means for displaying on the control panel a time out period during which the current status and at least one user privilege associated with the current status will remain in effect, an option for the user to extend the time out period, and an option for the user to view the information about the associated user privilege; and means for allowing the user to cancel the secure network connection and sign off independently of a specific secure function by clicking on a sign off option displayed on the control panel.

18. The system of claim 17, wherein the means for allowing the user at the computing device to establish the secure network connection further comprises means for allowing the user at a personal computer with a browser to establish the secure network connection between the personal computer and the website server via the global network.

19. The system of claim 17, wherein the means for allowing the user at the computing device to establish the secure network connection further comprises means for allowing the user to establish the secure network connection between the computing device and at least one website server in a federation of web servers.

20. The system of claim 17, wherein the means for providing the graphical user interface further comprises means for providing the graphical user interface by an application running on the computing device.

21. The system of claim 20, wherein the means for providing the graphical user interface further comprises means for downloading the application to the computing device via a host system.

22. The system of claim 20, wherein the means for providing the graphical user interface further comprises means for downloading the application to the computing device via the website server.

23. The system of claim 22, wherein the means for providing the graphical user interface further comprises means for downloading the application to the computing device when the secure network connection is established.

24. The system of claim 23, wherein the means for providing the graphical user interface further comprises means for downloading the application to the computing device automatically by the website server when the secure network connection is established.

25. The system of claim 20, wherein the means for providing the graphical user interface by the application further comprises means for providing the graphical user interface by a stand-alone utility that adopts formal protocols and can work on at least one secure server other than the website server.

26. The system of claim 25, wherein the means for providing the graphical user interface by the application further comprises means for downloading the stand-alone utility on the computing device.

27. The system of claim 17, wherein the means for providing the graphical user interface displaying the control panel further comprises means for continuously displaying the control panel at all times the computing device is activated.

28. The system of claim 27, wherein the means for providing the graphical user interface displaying the control panel further comprises means for providing an attribute to the control panel causing the control panel to be continuously visible on a front of a display screen of the computing device.

29. The system of claim 17, wherein the means for displaying on the control panel the time out period further comprises means for displaying on the control panel the time out period during which the user privilege will remain in effect in the form of a count-down timer.

30. The system of claim 17, wherein the means for displaying on the control panel the time out period further comprises means for displaying on the control panel information about the associated user privilege.

31. The system of claim 17, wherein the means for allowing the user to cancel the secure network connection and sign off further comprises means for displaying on the control panel options for the user to sign on and sign off independently of a specific secure function.

32. The system of claim 31, wherein the means for allowing the user to cancel the secure network connection and sign off further comprises means for allowing the user to simultaneously cancel the secure network connection, sign off independently of the specific function and revoke at least one privilege associated with the secure network connection with a selection of the sign off option.

33. A method for providing status indication and control to a user of a computing device with a secure network connection, comprising:

allowing the user at the computing device to establish the secure network connection between the computing device and a website server;

providing a graphical user interface displaying a control panel at the computing device with a current status of the secure network connection, the control panel having an attribute causing the control panel to be continuously visible on a front of a display screen of the computing device at all times the computing device is activated;

displaying on the control panel a time out period during which the current status and at least one user privilege associated with the current status will remain in effect, an option for the user to extend the time out period, and an option for the user to view the information about the associated user privilege; and allowing the user to simultaneously cancel the secure network connection, sign off independently of a specific function and revoke the privilege associated with the secure network connection with a selection of a sign off option displayed on the control panel.

* * * * *